US012586789B2

(12) United States Patent
Wang et al.

(10) Patent No.: US 12,586,789 B2
(45) Date of Patent: Mar. 24, 2026

(54) RECYCLING METHOD OF TERNARY MATERIAL MICROPOWDER, AND USE THEREOF

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Quele Wang, Foshan (CN); Changdong Li, Foshan (CN); Dingshan Ruan, Foshan (CN); Weijian Liu, Foshan (CN); Yong Cai, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 344 days.

(21) Appl. No.: 18/229,213

(22) Filed: Aug. 2, 2023

(65) Prior Publication Data

US 2024/0170662 A1 May 23, 2024

Related U.S. Application Data

(63) Continuation of application No. PCT/CN2022/090065, filed on Apr. 28, 2022.

(51) Int. Cl.
$$H01M\ 6/52 \qquad (2006.01)$$
$$C01G\ 53/50 \qquad (2025.01)$$
(Continued)

(52) U.S. Cl.
CPC ............ *H01M 4/525* (2013.01); *C01G 53/50* (2013.01); *H01M 4/366* (2013.01);
(Continued)

(58) Field of Classification Search
None
See application file for complete search history.

(56) References Cited

FOREIGN PATENT DOCUMENTS

| CN | 106848298 A | * | 6/2017 | |
|----|-------------|---|--------|--|
| CN | 108767246 A | * | 11/2018 | ............ H01M 4/364 |

(Continued)

*Primary Examiner* — David P Turocy
(74) *Attorney, Agent, or Firm* — Westbridge IP LLC

(57) ABSTRACT

The present disclosure discloses a recycling method of a ternary material micropowder, and use thereof. The recycling method includes: washing the ternary material micropowder with water, and adding a coating agent and an promotor; subjecting a resulting mixture to a reaction under heating and pressurization, and filtering to obtain a coated base material; subjecting the coated base material to sintering, adding an extracting agent to a resulting sintered material, and stirring and filtering to obtain a filter residue; and subjecting the filter residue to drying, sieving, and iron removal to obtain a ternary cathode material. In the present disclosure, the coating agent and the promotor are added to achieve high-pressure hydrothermal coating for the micropowder. The coating agent can optimize the storage performance of the material and increase the life of the material.

8 Claims, 5 Drawing Sheets

(51) Int. Cl.
    *H01M 4/36*       (2006.01)
    *H01M 4/525*     (2010.01)
    *H01M 10/0525*   (2010.01)
    *H01M 4/02*       (2006.01)

(52) U.S. Cl.
    CPC ..... *H01M 10/0525* (2013.01); *C01P 2004/03* (2013.01); *C01P 2006/40* (2013.01); *C01P 2006/82* (2013.01); *H01M 2004/028* (2013.01); *H01M 6/52* (2013.01)

(56)           References Cited

FOREIGN PATENT DOCUMENTS

| CN | 109065875 A | * | 12/2018 | .............. H01M 4/62 |
|----|-------------|---|---------|--------------------------|
| CN | 109442982 A | * | 3/2019 | ................ F27B 7/22 |
| CN | 110436531 A | * | 11/2019 | |
| CN | 112758991 A | * | 5/2021 | ............. C01G 53/82 |

* cited by examiner

Cycle capacity retention-(4.25 v - 0.5 C)

Capacity retention (4.25 v - 0.5 C)

Number of cycles

RECYCLING METHOD OF TERNARY MATERIAL MICROPOWDER, AND USE THEREOF

CROSS-REFERENCE TO RELATED APPLICATIONS

The present application is a continuation application of PCT application No. PCT/CN2022/090065 filed on Apr. 28, 2022, which claims the benefit of Chinese Patent Application No. 202111157697.X filed on Sep. 30, 2021. The contents of all of the aforementioned applications are incorporated by reference herein in their entirety.

TECHNICAL FIELD

The present disclosure belongs to the technical field of lithium-ion battery (LIB) materials, and specifically relates to a recycling method of a ternary material micropowder, and use thereof.

BACKGROUND

At present, with the rapid development and increasing annual sales volume of new energy vehicles, the sales volume of lithium batteries is also rising. As the main cathode materials for lithium batteries, ternary materials have the advantages of high energy density, prominent cycling performance, and the like, and the production capacity thereof also grows year by year. In a cathode material production process, the production of every 1 t of cathode material will be accompanied by the production of about 1% of small-particle micropowder, which is mainly produced during a crushing process. If the micropowder is admixed into a finished product, the cycling performance of the product will be compromised. A production capacity of a cathode material factory has reached tens of thousands of tons, and a remarkable amount of micropowder is produced in a production process every year. At present, many companies scrap the micropowder as waste from the production process.

SUMMARY OF THE INVENTION

The present disclosure is intended to solve at least one of the technical problems existing in the prior art. In view of this, the present disclosure provides a recycling method of a ternary material micropowder, and use thereof. The recycling method makes the originally scrapped material become a ternary cathode material with high economic value added (EVA) and prominent performance. The recycling method has low technical difficulty and is easy to realize.

According to one aspect of the present disclosure, a recycling method of a ternary material micropowder is provided, including the following steps:

S1: mixing a ternary material micropowder with water, stirring a resulting mixture for a specified time to obtain a first slurry, and dewatering the first slurry to obtain a micropowder filter cake;

S2: adding water to the micropowder filter cake, and stirring a resulting mixture during which a coating agent and a promotor are added to obtain a second slurry, where the promotor is one or more selected from the group consisting of polyimide (PI), polyoxyethylene (POE), polyethyleneimine (PEI), polypyrrole (PPy), tripolycyanamide, polyvinyl alcohol (PVA), ethylene glycol (EG), triethylamine (TEA), polyphenylene ether ketone (PPEK), and polythiophene (PTP);

S3: subjecting the second slurry to a reaction under heating and pressurization, and filtering to obtain a coated base material; and S4: subjecting the coated base material to sintering; adding an extracting agent to a resulting sintered material, and stirring and filtering to obtain a filter residue; and subjecting the filter residue to drying, sieving, and iron removal to obtain a ternary cathode material.

In some implementations of the present disclosure, in S1, the ternary material micropowder may have a particle size of Dv50<3.0 μm; and a liquid-to-solid ratio of the water to the ternary material micropowder may be 0.4 to 1.2 L/kg.

In some implementations of the present disclosure, in S1, the stirring may be conducted at a rotational speed of 100 rpm to 600 rpm; and preferably, the stirring may be conducted for 5 min to 30 min.

In some implementations of the present disclosure, in S1, the dewatering may be conducted through pressure filtration or centrifugation.

In some implementations of the present disclosure, in S1, the micropowder filter cake may have a moisture content of 5% to 16%.

In some implementations of the present disclosure, in S2, the coating agent may be one or more selected from the group consisting of $TiO_2$, $AL_2O_3$, $ZrO_2$, MgO, $SnO_2$, $WO_3$, $AL(OH)_3$, $Li_3PO_4$, CeO, $Li_4TiO_4$, and $In_2O_3$; and preferably, an amount of the coating agent added may be 0.1% to 0.9% of a mass of the ternary material micropowder. Further, after the coating agent is added, the stirring may be conducted for 3 min to 10 min.

In some implementations of the present disclosure, in S2, the promotor needs to be pretreated before added. That is, the promotor is added to an ethanol solution, and a resulting mixture is heated and stirred in a water bath or an oil bath for dissolution. Further, the ethanol solution may have a concentration of 5%.

In some implementations of the present disclosure, in S2, an amount of the promotor added may be 0.2% to 1.2% of the mass of the ternary material micropowder. Further, after the promotor is added, the stirring may be conducted for 2 min to 10 min.

In some implementations of the present disclosure, in S2, the second slurry may have a solid content of 20% to 60%; and the stirring may be conducted at a rotational speed of 100 rpm to 500 rpm.

In some implementations of the present disclosure, in S3, the reaction may be conducted at 100° C. to 200° C.; preferably, the reaction may be conducted at 1 MPa to 10 MPa; and preferably, the reaction may be conducted for 5 h to 10 h. Further, the reaction may be conducted in a high-pressure hydrothermal reactor.

In some implementations of the present disclosure, in S3, the coated base material may have a moisture content of <10%.

In some implementations of the present disclosure, in S4, the sintering may be conducted with a rotary kiln in an oxygen atmosphere; preferably, the sintering may be conducted at 300° C. to 900° C.; preferably, the sintering may be conducted for 3 h to 10 h at an oxygen concentration of >90%; and a thickness of the material may be controlled at 3 cm to 20 cm and preferably 6 cm to 15 cm. The sintering may be rotary kiln one-step sintering. With this sintering method, the ternary cathode material can be obtained through one-step sintering. Traditionally, it is mostly to use a roller kiln to conduct sintering two or three times. The rotary kiln requires less energy, gas, and consumables, resulting in large cost advantages.

In some implementations of the present disclosure, in S4, the extracting agent may be one or more selected from the group consisting of EG, sec-butyl acetate (SBA), kerosene, trioctyl tertiary amine, ethyl acetate, glycerin, N-methylpyr-rolidone (NMP), and benzene.

In some implementations of the present disclosure, in S4, the drying may be conducted at 100° C. to 200° C.; and a dried material may have a moisture content of <600 ppm.

In some implementations of the present disclosure, in S4, the sieving may be conducted at a mesh size of 200 mesh to 400 mesh.

In some implementations of the present disclosure, in S4, a device used for the iron removal may be an electromag-netic iron remover, and a magnetic field intensity of the device may be controlled at 5,000 Gauss to 9,000 Gauss.

The present disclosure also provides use of the method described above in the preparation of LIBs.

According to a preferred implementation of the present disclosure, the present disclosure at least has the following beneficial effects:

1. Through the treatment process of the present disclo-sure, a micropowder generated during a production process that needs to be scrapped can be converted into a ternary cathode material with prominent perfor-mance, which achieves the recycling of resources and improves the economic benefits. The traditional direct scrapping method cannot bring new economic benefits.

2. The process of the present disclosure is simple and easy to implement, where residual lithium on the surface that compromises the performance of a material can be dissolved through water washing and then removed through dewatering. In traditional treatment methods, an organic matter is often used to remove residual lithium and modify the surface of a material. In con-trast, the treatment method of the present disclosure is more economical.

3. In the present disclosure, the coating agent and the promotor are added to achieve high-pressure hydro-thermal coating for the micropowder. The coating agent can optimize the storage performance of the material and increase the life of the material. The promotor can promote the well coating of the coating agent on the material surface and prevent the coating agent from falling off. The promotor, if remaining in the material, will compromise the cycling performance of the mate-rial. Therefore, after the sintering, it is necessary to add an extracting agent to extract the residual promotor.

BRIEF DESCRIPTION OF DRAWINGS

The present disclosure is further described below with reference to accompanying drawings and examples.

4

Figure 5:
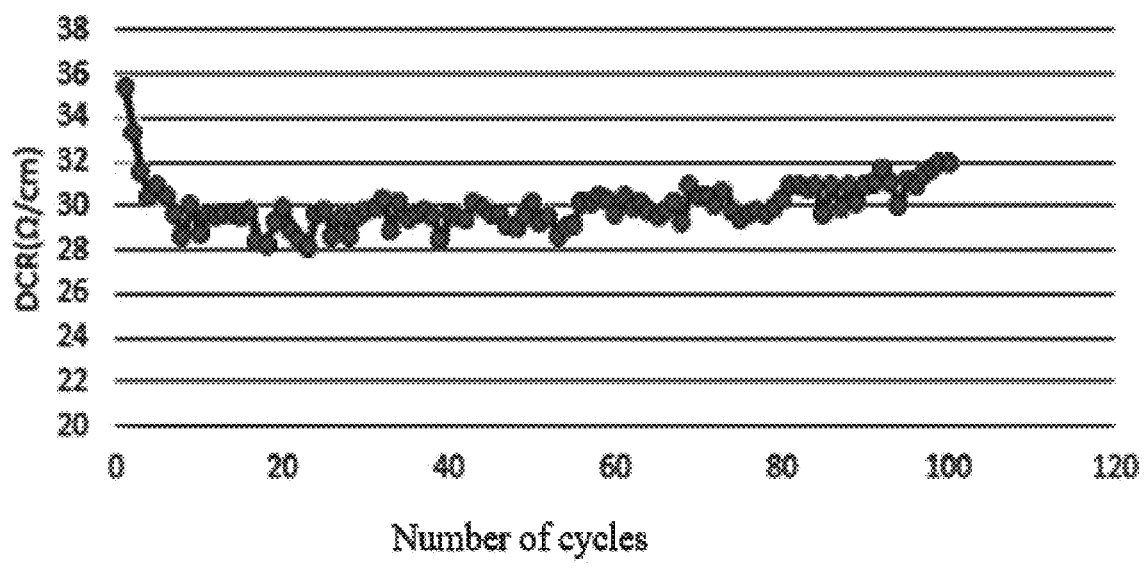
Figure 6:
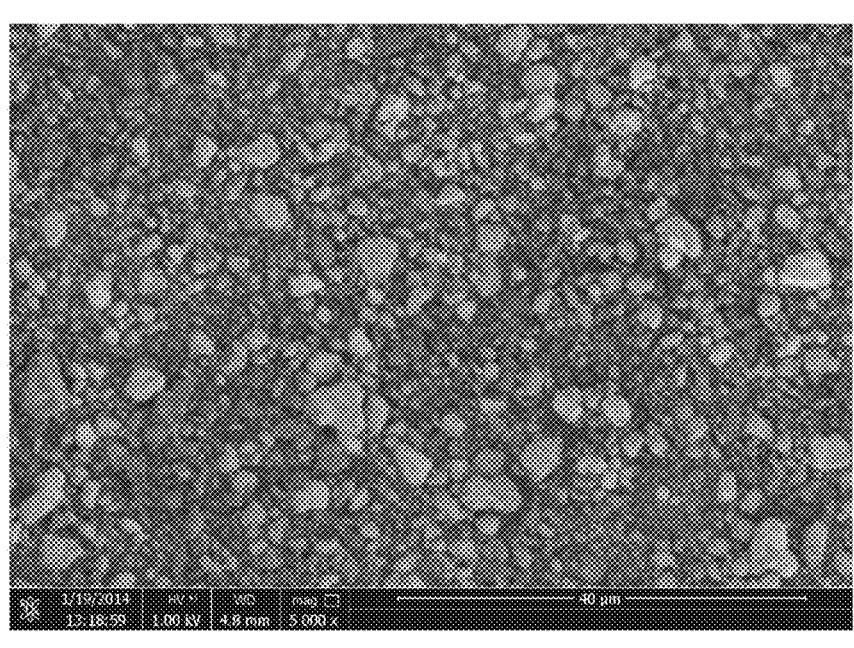
Figure 7:
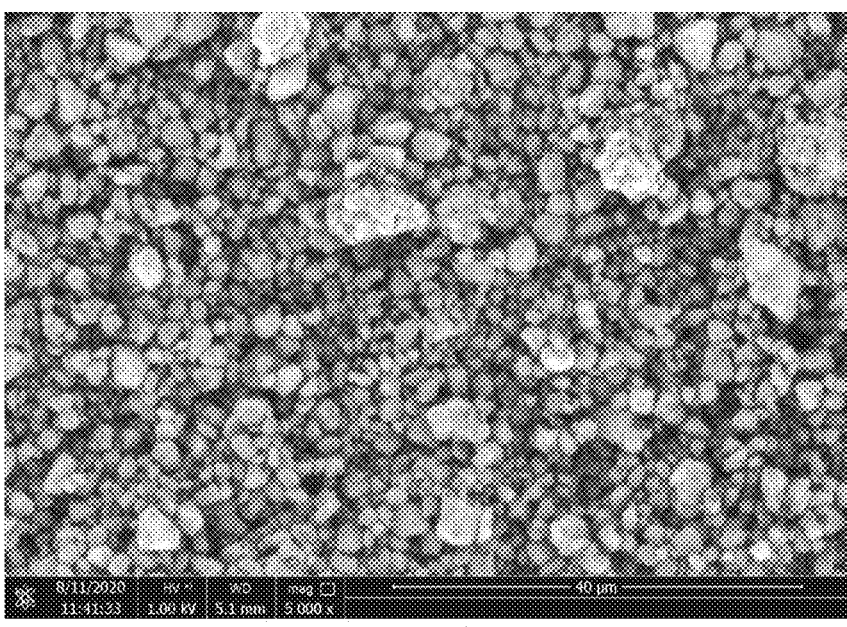
Figure 8:
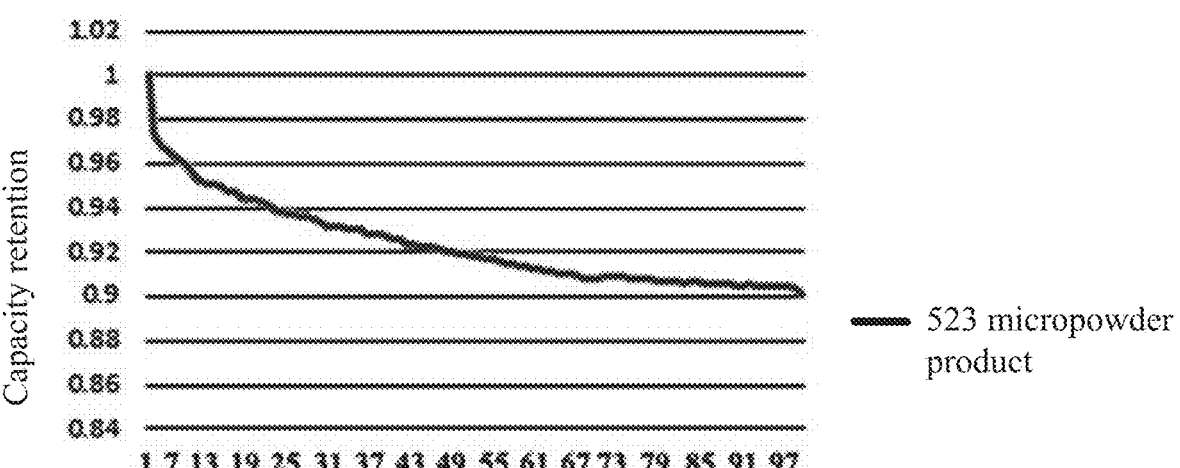
Figure 9:
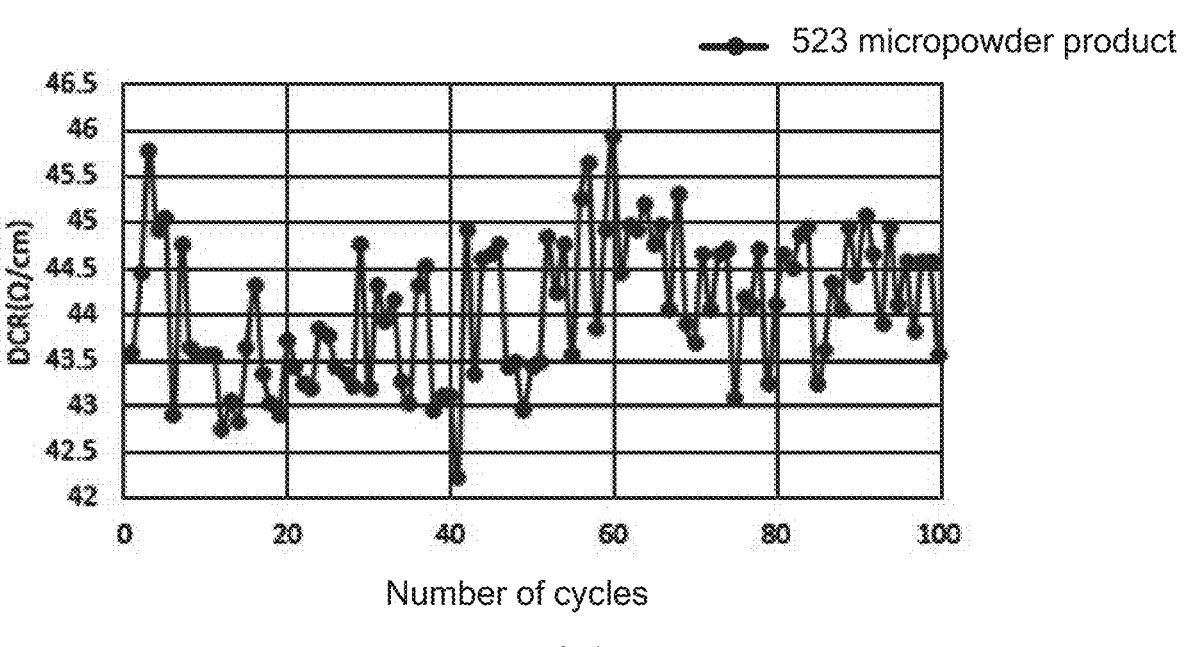

FIG. 5 is a DCR characteristic diagram of the finished ternary cathode material obtained in Example 1 of the present disclosure;

FIG. 6 is an SEM image of the $Li(Ni_{0.5}Co_{0.2}Mn_{0.3})O_2$ monocrystalline micropowder in Example 2 of the present disclosure;

FIG. 7 is an SEM image of the finished ternary cathode material obtained in Example 2 of the present disclosure;

FIG. 8 is a capacity retention characteristic diagram of the finished ternary cathode material obtained in Example 2 of the present disclosure; and FIG. 9 is a DCR characteristic diagram of the finished ternary cathode material obtained in Example 2 of the present disclosure.

DETAILED DESCRIPTION OF ILLUSTRATED EXAMPLES

The concepts and technical effects of the present disclo-sure are clearly and completely described below in conjunc-tion with examples, so as to allow the objectives, features and effects of the present disclosure to be fully understood. Apparently, the described examples are merely some rather than all of the examples of the present disclosure. All other examples obtained by those skilled in the art based on the examples of the present disclosure without creative efforts should fall within the protection scope of the present dis-closure.

Example 1

Figure 1:
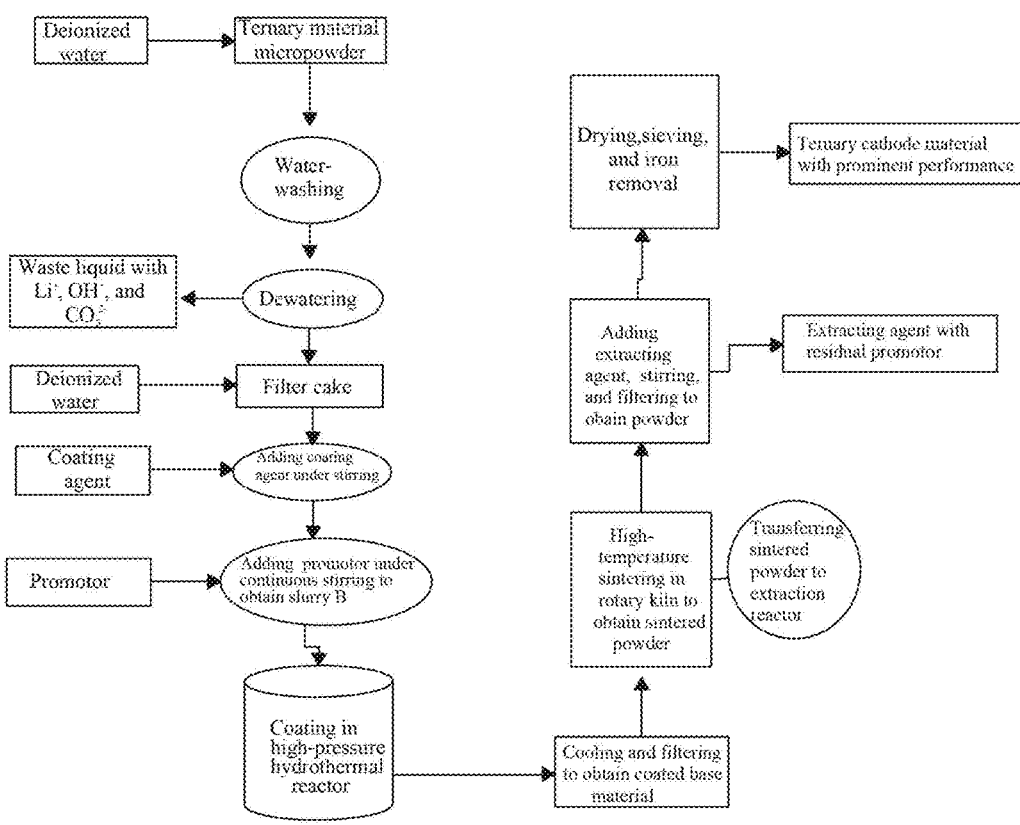
FIG. 1 is a schematic diagram of the synthesis process of the present disclosure.
Figure 2:
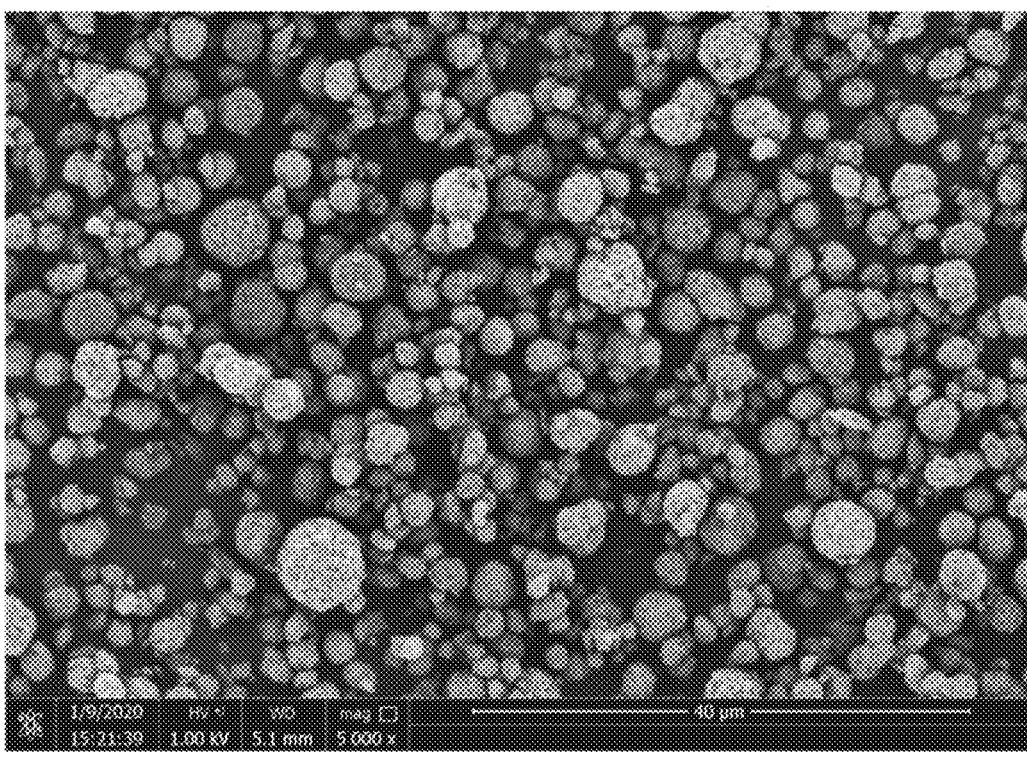
FIG. 2 is a scanning electron microscopy (SEM) image of the $Li(Ni_{0.8}Co_{0.1}Mn_{0.1})O_2$ polycrystalline micropowder in Example 1.

A recycling method of a $Li(Ni_{0.8}Co_{0.1}Mn_{0.1})O_2$ polycrys-talline micropowder was provided, and as shown in FIG. 1, a specific process was as follows:

(1) A micropowder produced during a $Li(Ni_{0.8}Co_{0.1}Mn_{0.1})O_2$ production process was col-lected. The collected micropowder had a particle size of Dv50<3.0 FIG. 2 is an SEM image of the $Li(Ni_{0.8}Co_{0.1}Mn_{0.1})O_2$ micropowder. The collected $Li(Ni_{0.8}Co_{0.1}Mn_{0.1})O_2$ micropowder had extremely small particles and was covered with residual lithium hydroxide and lithium carbonate.

(2) The collected micropowder was mixed with pure water, and then water-washing was conducted in a water-washing kettle at a rotational speed of 100 rpm for 20 min to obtain a water-washing slurry. A liquid-to-solid ratio of the pure water to the micropowder was 0.6 L/kg.

(3) The obtained water-washing slurry was dewatered through pressure filtration to obtain a filter cake. After the dewatering, a surface residual lithium content was reduced by 1,000 ppm to 9,000 ppm. The filter cake had a moisture content of 8%.

(4) Pure water was added to the filter cake, and a resulting slurry was stirred for mixing. The slurry had a solid content of 35%. The stirring was conducted using a high-speed stirrer at a stirring speed of 300 rpm. During the mixing, coating agents $TiO_2$ and $AL_2O_3$ were first added at a total amount 0.8% of a mass of the ternary material micropowder, and then the stirring was con-ducted for 5 min.

(5) After the coating agents were added, an promotor was further added to the slurry. The promotor was PI. The promotor was pretreated before added. That is, the promotor was added to a 5% ethanol solution, and then a resulting mixture was heated and stirred in a water bath or an oil bath for dissolution and then added to the slurry. The promotor was added at an amount 0.5% of a mass of the ternary material micropowder. After the promotor was added, stirring was conducted for 8 min.

(6) A slurry obtained from the previous step was subjected to high-pressure hydrothermal coating for 5 h at 150° C. and 4 MPa in a high-pressure hydrothermal reactor, and a resulting product was filtered to obtain a coated base material with a moisture content of less than 10%.

(7) The coated base material obtained from the previous step was subjected to one-step sintering in a rotary kiln under an oxygen atmosphere, where a sintering temperature was 500° C., a cooling time was 4 h, a sintering time was 5 h, an oxygen concentration was higher than 90%, and a material thickness was controlled at 6 cm to 15 cm.

(8) EG was added to a material obtained after the sintering in the rotary kiln, and a resulting slurry was fully stirred for 5 min at a rotational speed of 120 rpm to perform an extraction.

(9) A material obtained after the extraction in the previous step was dried at 130° C. for 100 min in an oven, and a dried material was sieved through a 400-mesh sieve and subjected to iron removal to obtain a ternary cathode material with prominent performance. The iron removal was conducted with an electromagnetic iron remover at a magnetic field intensity of 8,000 Gauss.

Figure 3:
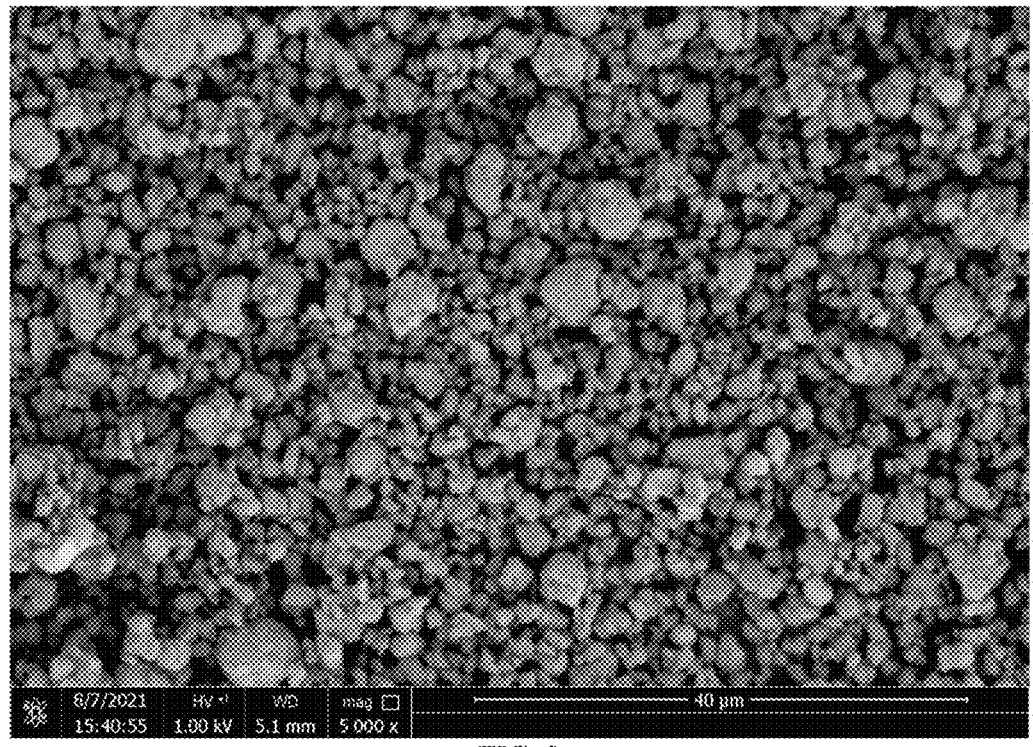
FIG. 3 is an SEM image of the finished ternary cathode material obtained in Example 1.
Figure 4:
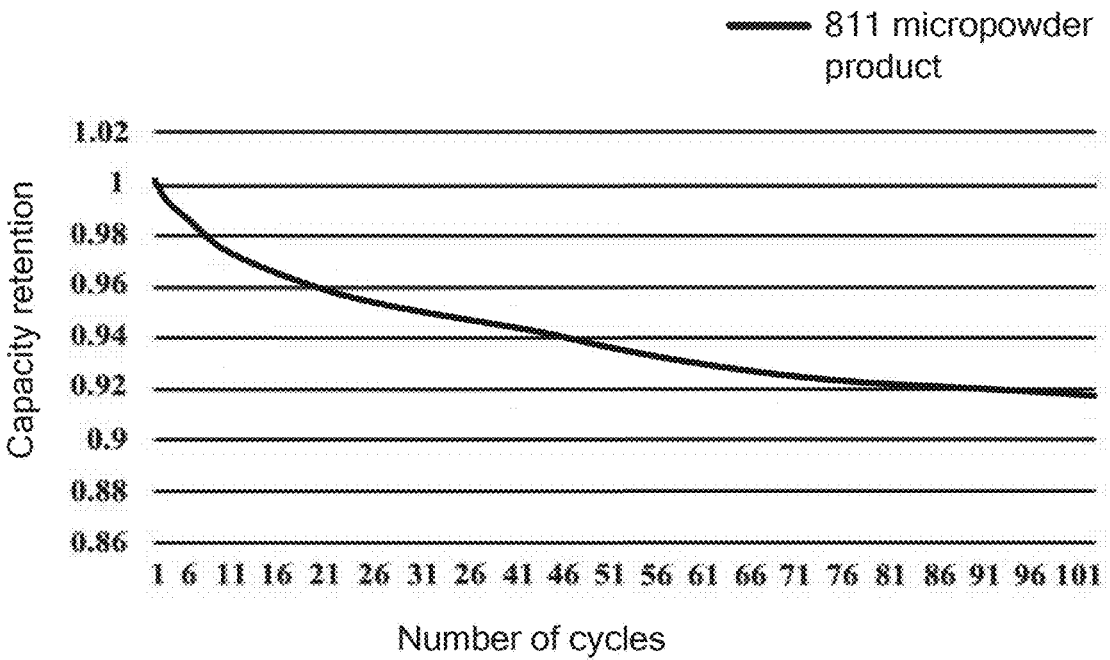
FIG. 4 is a capacity retention characteristic diagram of the finished ternary cathode material obtained in Example 1 of the present disclosure.

Characterization test: As shown in FIG. 3, the micropowder produced during a $Li(Ni_{0.8}Co_{0.1}Mn_{0.1})O_2$ production process, after being treated by this process, had a single crystal-like morphology and a significantly-reduced surface residual lithium content. The product had a residual lithium content of 931 ppm (according to a potentiometric titration test) and a high specific surface area (BET) of 0.83 $m^2/g$ (according to a static test). The product had a first-cycle discharge capacity of 183.6 mAH/g at 4.25 V/0.5 C; and according to an electrical performance cycle test (as shown in FIG. 4), the capacity retention was still 91.8% after 100 charging-discharging cycles at 4.25 V/0.5 C, indicating prominent electrical performance. A DCR test was conducted, as shown in FIG. 5. In the test of the first cycle, DCR was 35.3 S2/cm; and during the test of 100 cycles at 4.25 V/0.5 C, the DCR did not increase significantly, indicating that the micropowder treatment process of the present disclosure can lead to a ternary cathode material with prominent performance, which is suitable for the preparation of LIBs.

Example 2

A recycling method of a $Li(Ni_{0.5}Co_{0.2}Mn_{0.3})O_2$ polycrystalline micropowder was provided, and a specific process was as follows:

(1) FIG. 6 is an SEM image of a $Li(Ni_{0.5}Co_{0.2}Mn_{0.3})O_2$ monocrystalline micropowder collected during a production process, and it can be seen from the SEM image that there is a lot black lithium hydroxide and lithium carbonate adhered to the micropowder. The collected $Li(Ni_{0.5}Co_{0.2}Mn_{0.3})O_2$ monocrystalline micropowder was mixed with pure water, and then water-washing was conducted in a water-washing kettle at a rotational speed of 300 rpm for 10 min to obtain a water-washing slurry. A liquid-to-solid ratio of the pure water to the micropowder was 1 L/kg.

(2) The obtained water-washing slurry was dewatered through centrifugation to obtain a filter cake. After the dewatering, a surface residual lithium content was reduced by 200 ppm to 1,000 ppm. The filter cake had a moisture content of about 10%.

(3) Pure water was added to the filter cake, and a resulting slurry was stirred for mixing. The slurry had a solid content of 30%. The stirring was conducted using a high-speed stirrer at a stirring speed of 500 rpm. During the mixing, coating agents $ZrO_2$ and MgO were added at a total amount 0.5% of a mass of the ternary material micropowder, and then the stirring was conducted for 5 min.

(4) After the coating agents were added, a promotor was further added to the slurry. The promotor was PVA. The promotor was pretreated before added. That is, the promotor was added to a 5% ethanol solution, and then a resulting mixture was heated and stirred in a water bath or an oil bath for dissolution and then added to the slurry. The promotor was added at an amount 0.6% of a mass of the ternary material micropowder. After the promotor was added, stirring was conducted for 10 min.

(5) A slurry obtained from the previous step was subjected to high-pressure hydrothermal coating for 5 h at 120° C. and 4 MPa in a high-pressure hydrothermal reactor, and a resulting product was filtered to obtain a coated base material with a moisture content of less than 10%.

(6) The coated base material obtained from the previous step was subjected to one-step sintering in a rotary kiln under an oxygen atmosphere, where a sintering temperature was 540° C., a cooling time was 4 h, a sintering time was 5 h, an oxygen concentration was higher than 90%, and a material thickness was controlled at 6 cm to 15 cm.

(7) SBA was added to a material obtained after the sintering in the rotary kiln, and a resulting slurry was fully stirred for 5 min at a rotational speed of 120 rpm.

(8) A material obtained after the extraction in the previous step was dried at 150° C. for 170 min in an oven, and a dried material was sieved through a 200-mesh sieve and subjected to iron removal to obtain a ternary cathode material with prominent performance. The iron removal was conducted with an electromagnetic iron remover at a magnetic field intensity of 7,000 Gauss.

Characterization test: As shown in FIG. 7, the micropowder produced during a $Li(Ni_{0.5}Co_{0.2}Mn_{0.3})O_2$ production process, after being treated by this process, had a single crystal-like morphology and showed no obvious residual lithium in the SEM image. The product had a residual lithium content of 386 ppm (according to a potentiometric titration test) and a BET of 0.95 $m^2/g$ (according to a static test). The product had a first-cycle discharge capacity of 167.2 mAH/g at 4.25 V/0.5 C; and according to an electrical performance cycle test (as shown in FIG. 8), the capacity retention was still 90.1% after 100 charging-discharging cycles at 4.25 V/0.5 C, indicating prominent electrical performance. A DCR test was conducted, as shown in FIG. 9. In the test of the first cycle, DCR was 43.6 S2/cm; and during the test of 100 cycles at 4.25 V/0.5 C, the DCR did not increase significantly, indicating that the micropowder treatment process of the present disclosure can lead to a ternary cathode material with prominent performance, which is suitable for the preparation of LIBs.

The present disclosure is described in detail with reference to the accompanying drawings and examples, but the present disclosure is not limited to the above examples. Within the scope of knowledge possessed by those of ordinary skill in the technical field, various changes can also be made without departing from the purpose of the present disclosure. In addition, the examples in the present disclosure or features in the examples may be combined with each other in a non-conflicting situation.

The invention claimed is:

1. A recycling method of a ternary material micropowder, comprising the following steps:

S1: mixing a ternary material micropowder with water, stirring a resulting mixture for a specified time to obtain a first slurry, and dewatering the first slurry to obtain a micropowder filter cake; the ternary material is $Li(Ni_{0.8}Co_{0.1}Mn_{0.1})O_2$ or $Li(Ni_{0.5}Co_{0.2}Mn_{0.3})O_2$;

S2: adding water to the micropowder filter cake, and stirring a resulting mixture during which a coating agent and a promotor are added to obtain a second slurry, wherein the promotor is one or more selected from the group consisting of polyimide, polyoxyethylene, polyethyleneimine, polypyrrole, tripolycyanamide, ethylene glycol, triethylamine, polyphenylene ether ketone, and polythiophene;

S3: subjecting the second slurry to a reaction under heating and pressurization, and filtering to obtain a coated base material; and S4: subjecting the coated base material to sintering; adding an extracting agent to a resulting sintered material, the extracting agent is one or more selected from the group consisting of ethylene glycol, sec-butyl acetate, kerosene, trioctyl tertiary amine, ethyl acetate, glycerin, N-methylpyrrolidone, and benzene; and stirring and filtering to obtain a filter residue; and subjecting the filter residue to drying, sieving, and iron removal to obtain a ternary cathode material.

2. The method according to claim 1, wherein in S1, the ternary material micropowder has a particle size of Dv50<3.0 μm; and a liquid-to-solid ratio of the water to the ternary material micropowder is 0.4 to 1.2 L/kg.

3. The method according to claim 1, wherein in S1, the stirring is conducted at a rotational speed of 100 rpm to 600 rpm; and the stirring is conducted for 5 min to 30 min.

4. The method according to claim 1, wherein in S1, the micropowder filter cake has a moisture content of 5% to 16%.

5. The method according to claim 1, wherein in S2, the coating agent is one or more selected from the group consisting of $TiO_2$, $AL_2O_3$, $ZrO_2$, MgO, $SnO_2$, $WO_3$, $AL(OH)_3$, $Li_3PO_4$, CeO, $Li_4TiO_4$, and $In_2O_3$; and an amount of the coating agent added is 0.1% to 0.9% of a mass of the ternary material micropowder.

6. The method according to claim 1, wherein in S2, an amount of the promotor added is 0.2% to 1.2% of a mass of the ternary material micropowder.

7. The method according to claim 1, wherein in S3, the reaction is conducted at 100° C. to 200° C.; the reaction is conducted at 1 MPa to 10 MPa; and the reaction is conducted for 5 h to 10 h.

8. The method according to claim 1, wherein in S4, the sintering is conducted with a rotary kiln in an oxygen atmosphere; the sintering is conducted at 300° C. to 900° C.; and the sintering is conducted for 3 h to 10 h.

* * * * *